United States Patent [19]

Suzuki

[11] 3,754,695

[45] Aug. 28, 1973

[54] AUTOMATIC SHUT-OFF SYSTEM FOR MAGNETIC TAPE REPRODUCERS AND RECORDERS

[76] Inventor: Nobuo Suzuki, 26-9 Yokoyama 3-chome, Sagamihara-shi, Japan

[22] Filed: July 20, 1972

[21] Appl. No.: 273,374

[30] Foreign Application Priority Data

Dec. 25, 1971 Japan .................................... 47/889

[52] U.S. Cl. .................... 226/174, 226/181, 274/4 D

[51] Int. Cl. ............................................ G11b 15/28

[58] Field of Search ......................... 226/46, 48, 174, 226/180, 181, 186, 187; 274/4 B, 4 D

[56] References Cited

UNITED STATES PATENTS 3,632,115 1/1972 Ban ..................................... 274/4 B 3,633,920 1/1972 Ban ..................................... 274/4 B

*Primary Examiner*—Richard A. Schacher

*Attorney*—Benjamin H. Sherman, Donald J. Simpson et al.

[57] ABSTRACT

A magnetic tape reproducer and recorder with an automatic switch-off system, including a pressure roller driven by a motor driven shaft and engaged by another shaft which is adapted to be rotated when engaging the pressure roller and to be rotated independently of the pressure roller so as to cause the giving of a signal which causes the starting key or starting button of the tape device to return to its inoperative starting position when the tape has run off.

4 Claims, 1 Drawing Figure

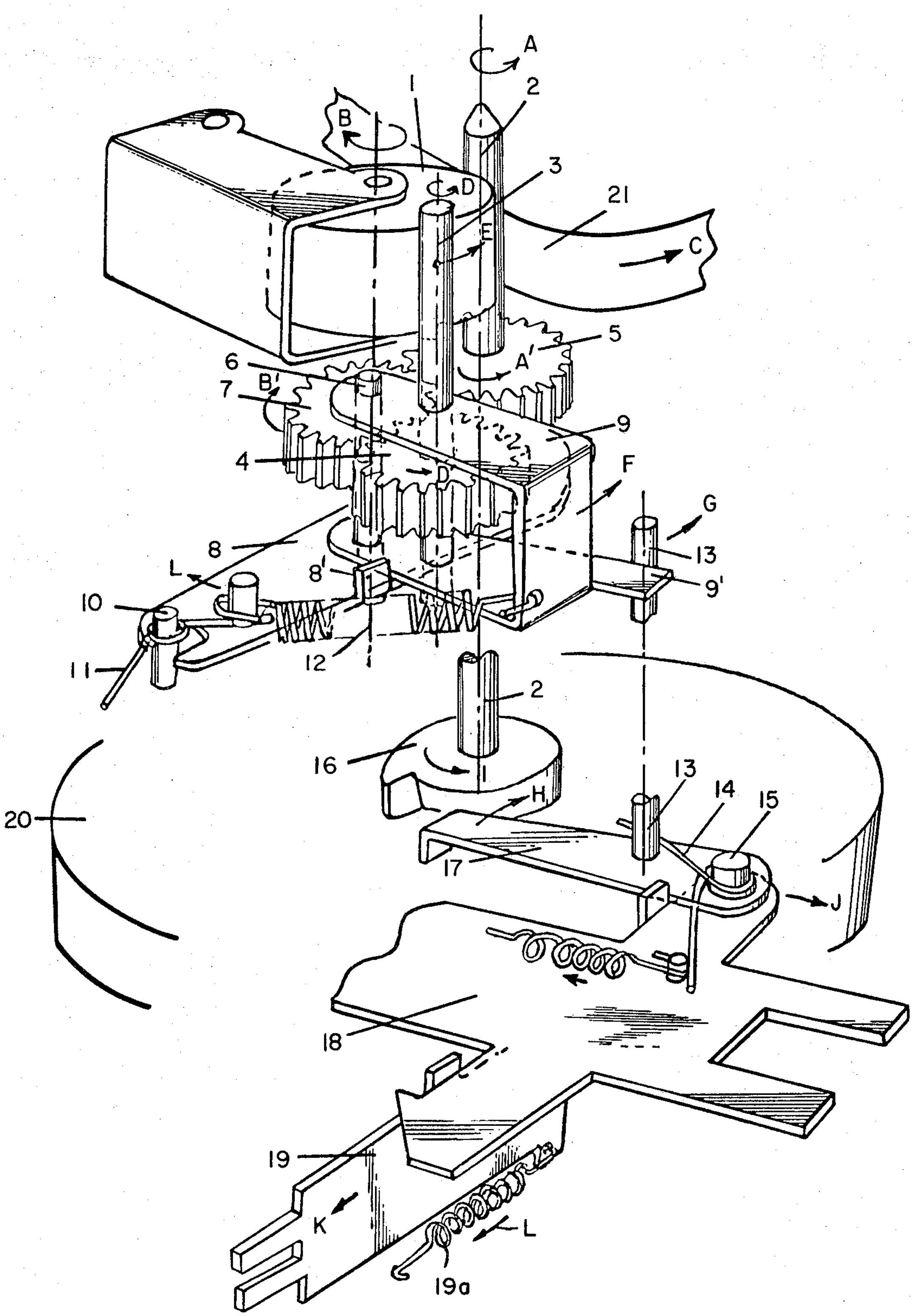
A
2
B
1
3
D
21
E
C
5
A'
6
B'
7
9
4
D
F
G
13
8
9'
L
8'
10
12
11
2
16
I
20
H
13
14
15
17
J
18
19
K
L
19a

AUTOMATIC SHUT-OFF SYSTEM FOR MAGNETIC TAPE REPRODUCERS AND RECORDERS

The present invention relates to a magnetic tape reproducer or recorder, and more particularly to a compact magnetic tape reproducer or recorder which produces a signal to cause an automatic switch-off of the magnetic tape reproducer or recorder when the magnetic tape has run off.

There have already been designed various types of systems for automatically switching off magnetic tape reproducers or recorders when the tape has run off from the take-off reel. These known automatic switch-off systems are complicated in structure and require a considerably advanced and well trained technique. Two kinds of automatic switch-off systems are available which either operate electrically or mechanically. In the electrical system a special signal tape is provided on a part of the magnetic tape's end which is capable to sense a signal by photoelectrically or magnetically or by electric contact when the magnetic tape has run off. This system is effective and reliable, however, requires a complicated structure and is very expensive.

In a known mechanical system a signal is sensed by transition of the magnetic tape tension at the end of the tape. However, this type of system is liable to produce scratches on the surface of the tape.

It is an object of the present invention to provide a compact magnetic tape reproducer or recorder, especially for magnetic tape of "Cassette" type, with a novel automatic switch-off system, which is capable of giving a signal which mechanically turns off the tape device when the tape has run off, and which can be operated easily and reliably.

Another object of the present invention is to provide a magnetic tape reproducer or recorder having an improved automatic switch-off system, which is simple in structure and can be manufactured at low cost.

Still another object of the present invention is to provide an improved automatic switch-off system which requires no additional signal tape or material on the magnetic tape.

A still further object of the present invention is to provide an improved automatic switch-off system which can be operated without fear of producing scratches on the magnetic tape.

These and other objects as well as the features and advantages of the present invention will become apparent by reading the following detailed description in conjunction with the accompanying drawing.

IN THE DRAWING:

The drawing is a perspective view of a mechanism of the automatic switch-off system embodying the present invention.

Referring to the drawing, the reference numeral 1 represents a pivotally mounted pressure roller of a magnetic tape reproducer or recorder of the present invention. This pressure roller 1 rotates clockwise in the direction of the arrow B and feeds the magnetic tape 21 by pressing it against the vertical drive shaft 2 which rotates in the direction of the arrow A during the operation of the tape moving device.

The said rotation of the pressure roller 1 causes the feeding of the magnetic tape 21 in the direction of the arrow C, whereby the speed of said rotation of the pressure roller 1 is controlled by the feeding speed of the tape 21, and the pressure roller 1 is caused to stop its rotation when the feeding of the tape 21 is stopped.

Another vertically disposed shaft 3 is arranged parallel to the pressure roller 1 and spaced therefrom and is in pressure engagement with the circumference thereof. The other shaft 3 is supported by the upper horizontal arm of a U-shaped bracket 9 which is rotatably supported on a vertical shaft 6 the upper end of which carries the pressure roller 1 which is mounted in another pivotally supported U-shaped bracket.

The shaft 3 carries fixedly thereon a gear 4, and a gear 7 is loosely supported by the shaft 6 and adapted to be rotatable independently of the shaft 6, and a gear 5 is fixedly attached to the drive shaft 2, whereby the said three gears 4, 7 and 5 are disposed in meshing relation with each other, in that gear 4 meshes with gear 7 and gear 7 meshes with gear 5.

In the drawing, the gears 4, 7 and 5 are shown as having all the same diameter. As a result, the rotations of the said gears 4, 7 and 5 are in the direction of the arrow marks A', B' and D', respectively, according to the rotation of the shaft 2 in the direction of the arrow A, thus the shaft 3 is rotated in the direction of the arrow D.

The shaft 6 which rotatably supports the said bracket 9 is fixed on a base plate 8 which is also used for the shaft 2. One end of the plate 8 is rotatably supported and a helical spring 12 is arranged between the base plate 8 and the bracket 9, so as to cause one edge of the lower arm of the bracket to be urged into engagement with a stop lug 8' on the plate 8.

One end of the base plate 8 is freely movably supported within a limited range by a slot occupied by a pin 10, and is urged by a leg spring 11 on the pin 10 in the direction of the arrow L.

The leg spring 11 is provided in order to urge the shaft 3 in engagement with the pressure roller 1.

Reference numeral 18 represents a known horizontal locking bar which is provided at its forked end with a not illustrated button. This locking bar 18, when the starting key 19 is pressed, holds the key 19 against the force of a spring 19a which urges the key 19 into the direction of the arrow K. On the locking bar 18 one end of a cancel lever 17 is rotatably mounted on a pivot pin 15. The other free end of the cancel lever 17 is arranged to be able to be moved into and out of the range of a cancel cam 16 which is concentrically attached to a flywheel 20, so that the cancel lever 17 can be engaged and actuated when moving into the range of rotation of the cam 16, rotating in the direction of the arrow I.

At the same time, a pin 13 mounted on the cancel lever 17 is provided to be urged by a projection 9' on the lower arm of the bracket 9 in the direction of the arrow G against the tension of a leg spring 14 wound about the pivot pin 15.

The following description is directed to the manner in which the magnetic tape on the reproducer and recorder of the present invention is controlled by the device so far described.

In order to start the magnetic tape 21 on the reproducer or recorder to run, the pressure roller 1 is brought into engagement with the shaft 2 and the other shaft 3, and the motor driven shaft 2 causes the magnetic tape 21 to run counterclockwise in the direction of the arrow C, and at the same time the pressure roller 1 is rotated clockwise in the direction of the arrow B.

The gear 4 is caused to rotate counterclockwise in the direction of the arrow D' by the gear 7 which latter meshes with the gear 5, which is fixed on the drive shaft 2, so that the shaft 3 is rotated counterclockwise in the direction of the arrow D by the gear 4.

Since three gears 4, 7 and 5 have the same size and the teeth have all the same form, and also the shaft 2 and the shaft 3 are provided with the same diameter, the momentum of both shafts 2 and 3 is the same. As a result, the shaft 3 is rotating at a certain fixed position on the pressure roller 1 during the tape device at Play/-Record position until the tape has run off.

At the same time, the locking bar 18 which is holding the starting key or button 19 in operative position is also retaining the cancel lever 17 of which the free end extends into the path of the cancel cam 16.

When the magnetic tape has run off, the magnetic tape 21 is caused to stop by the tape-end which is fixed to the tape reel, and even though the shaft 2 continues to rotate for a moment, relatively, the pressure roller 1 is caused to stop.

The other shaft 3, however, continues its rotation owing to the rotation of the gears 5, 7 and 4 which are rotated by the drive shaft 2, and the result is that some action takes place between the pressure roller 1 and the other shaft 3 so that the latter is forced to move as a whole in the direction of the arrow E, because the shaft 3 is urged by the spring 12 against the pressure roller 1. This movement is transmitted by the bracket 9 in the direction of the arrow F against the tension of the spring 12, so that the projection 9' touches the pin 13 and pushes it away in the direction of the arrow G. And then, the free end of the cancel lever 17 is moved in the direction of the arrow H against the force exerted by the spring 14, and is moved into the area of the cancel cam 16, whereby said lever 17 is engaged by the cam 16, so that the lever 17 and the locking bar 18 are urged by the rotation of the cam 16 in the direction of the arrow J, causing the starting key 19 to be released and returned under the action of the spring 19a in the direction of the arrow L, shown in the drawing, to its starting position.

As a result, all mechanical mechanisms of the reproducing and recording device are stopped, the power switch is opened, and all action on the magnetic tape reproducer or recorder is discontinued.

The present invention is particularly useful in magnetic tape reproducers and recorders which employ a magnetic tape in so-called "Cassette". However, the invention can easily be used in connection with other types of magnetic tape reproducers or recorders such as the reel-to-reel devices or the open-reel devices in which one end of the magnetic tape is fixed to the tape reel.

What I claim is:

1. An automatic switch-off system for a magnetic tape reproducer and recorder provided with a manually operable starting key adapted to be locked by a locking bar in the running position of the reproducer and recorder, said switchoff system comprising a drive shaft, a pivotally mounted pressure roller urging said magnetic tape in engagement with said drive shaft, another shaft extending parallel to said drive shaft, means causing said other shaft to engage said pressure roller and to be displaced away from said pressure roller when after the run-off of said tape the end portion of the same is stopped and arrests the rotation of said pressure roller, and means actuated by said displaced other shaft to unlock said starting key so that the latter returns to its starting position in which the tape recorder and reproducer is switched off.

2. An automatic switch-off system according to claim 1, including gear means connecting said drive shaft with said other shaft to drive the latter, a pivotally mounted bracket in which said other shaft is rotatably supported, means for rotatably supporting a portion of said gear means in said bracket, spring means attached to said bracket for causing it to move in a direction in which said other shaft engages said pressure roller, said means for causing said other shaft to be moved away from said pressure roller being operatively connected with said bracket.

3. An automatic switch-off system according to claim 2, in which said gear means comprises three gears all of which have the same diameter, one of said three gears being fixedly mounted on said drive shaft and another one of said gears being fixedly mounted on said other shaft, while the third gear is in mesh with both of said two first mentioned gears and is rotatable about an axis forming the pivot axis of said bracket.

4. An automatic switch-off system according to claim 1, including gear means connecting said drive shaft with said other shaft to drive the latter, a pivotally mounted bracket in which said other shaft is rotatably supported, means for rotatably supporting a portion of said gear means in said bracket, spring means attached to said bracket for causing it to move in a direction in which said other shaft engages said pressure roller, said means for causing said other shaft to be moved away from said pressure roller being operatively connected with said bracket, said locking bar being operatively connected with a cancel lever and said manually operable starting key.

* * * * *